UNITED STATES PATENT OFFICE.

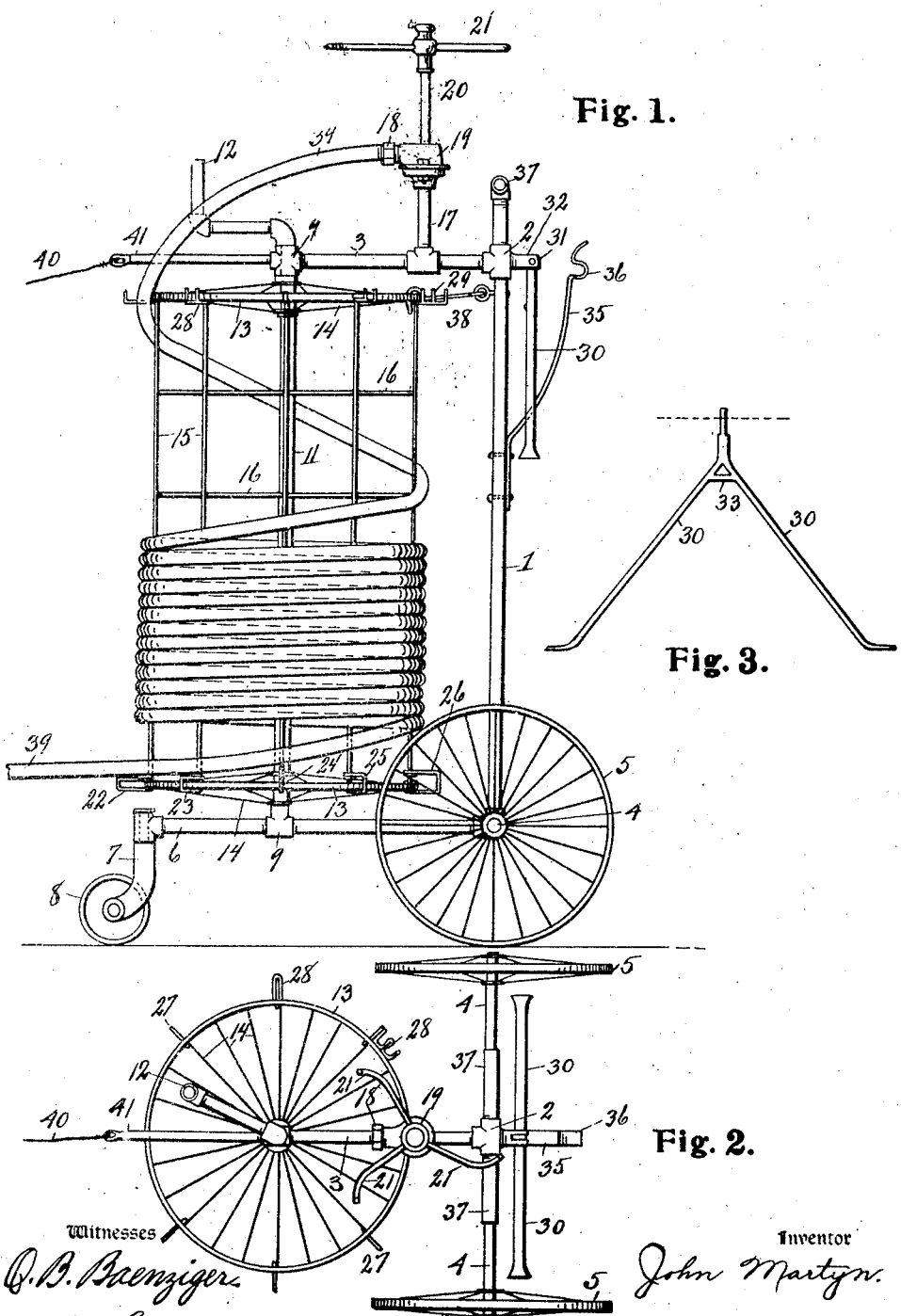

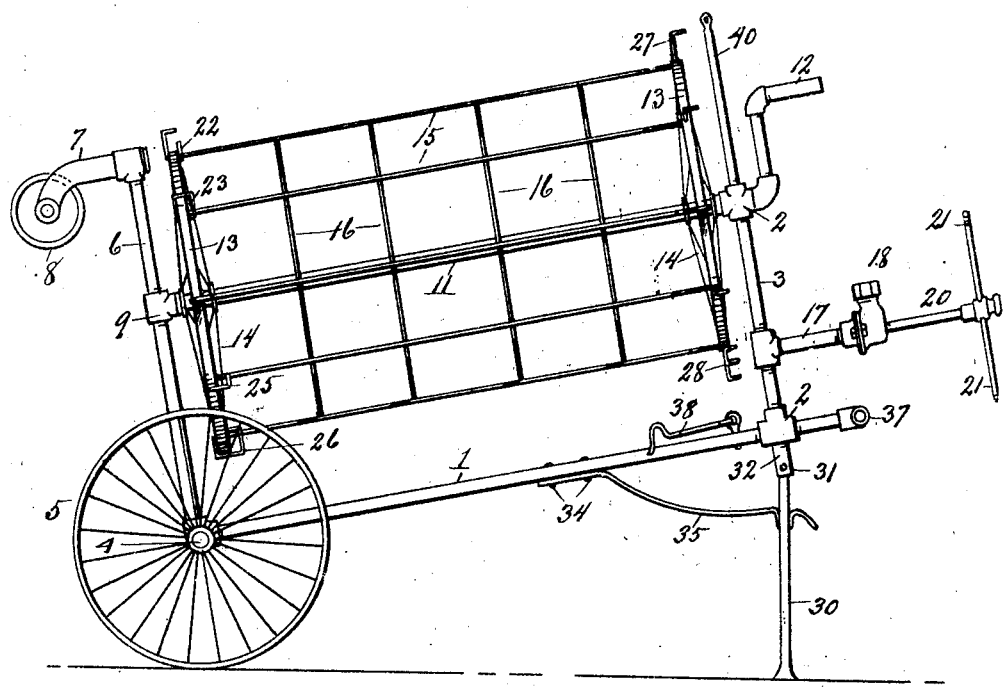
Fig. 4.
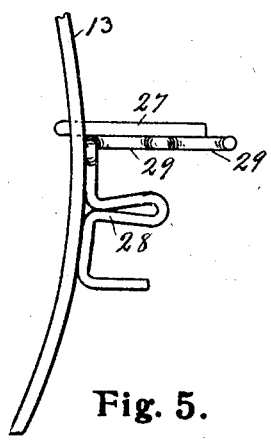
Fig. 5.
Fig. 6.
Fig. 7.

JOHN MARTYN, OF DETROIT, MICHIGAN.

HOSE-REEL.

1,010,656.     Specification of Letters Patent.     Patented Dec. 5, 1911.

Application filed June 16, 1908, Serial No. 438,730. Renewed September 15. 1911. Serial No. 649,531.

*To all whom it may concern:*

Be it known that I, JOHN MARTYN, a citizen of the United States, residing at Detroit, in the county of Wayne, State of Michigan, have invented certain new and useful Improvements in Hose-Reels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a portable hose reel, and consists in the construction and arrangement of parts hereinafter more fully set forth and pointed out particularly in the claims.

The object of the invention is to provide a reel of the character described, of comparatively simple and inexpensive construction in which the arrangement is such as to enable the hose to be readily wound upon the reel in such a manner as to afford drainage therefor, obviating the injury to the hose incident to water lying therein as is common with reels in general use, provision being made for supporting the reel in an inclined position when rolling the hose thereon. A further provision is made for directing water through the hose when wound upon the reel, if desired, and for employing a water sprinkler in connection with such an arrangement. A further arrangement provides for the transportation of the reel from place to place when serving as a support for a lawn sprinkler, and for supporting the hose in any desired position thereon when conveying water to said sprinkler or when the ordinary spraying nozzle is employed.

The above object is attained by the structure illustrated in the accompanying drawings, in which—

Figure 1 is an elevation of a hose reel embodying my invention, showing said reel in a vertical position. Fig. 2 is a plan view of Fig. 1. Fig. 3 is an elevation of the brace legs which are pivoted to the frame and serve to support the reel in an inclined position. Fig. 4 is an elevation of the reel in an inclined position supported by said pivoted legs. Fig. 5 is a fragmentary view in plan of a portion of the reel showing the guards or fingers for maintaining the hose in place thereon. Fig. 6 is a similar view. Fig. 7 is a fragmentary view partly in section through the circular ends of the reel, showing the manner of forming the radially projecting loops which confine the hose upon the reel when being wound thereon.

Referring to the characters of reference, 1 designates the main bar or tube of the frame, which is preferably formed of gas pipe of the requisite gage and which carries at its upper or forward end a coupling 2. Projecting from said coupling at right angles to the tube 1 is the end tube 3. The lower or rear end of the main tube is connected centrally to the axle 4 upon the ends of which are journaled the transporting wheels 5. Connected with the axle and extending therefrom at right angles to the tube 1 is the lower or rear end tube 6 having at its forward end a swiveled fork 7 between the sides of which is journaled the roller 8. The length of the forked sides is such that when the apparatus is in the position shown in Fig. 1, the end tube 6 will stand in a horizontal and the main tube in a vertical position.

Mounted upon the end tubes 3 and 6 are the couplings 9 and 10 respectively in which is journaled the shaft 11 of the hose reel one end of said shaft extending through the coupling 9 and carrying the crank 12. The reel proper consists of the circular ends 13 braced by the spokes 14 and the longitudinal reel bars 15 extending between said circular ends and connected thereto, the longitudinal bars of the reel being braced by the internal hoops 16 disposed within the reel between the ends thereof.

Mounted upon the end tube 3 is a standard 17 carrying at its upper end a hose coupling 18 communicating with a hollow head 19 which in turn communicates with and supports the vertical pipe 20 having at its upper end the rotary sprinkler arms 21.

Mounted upon and projecting radially from the lower end of the reel are the loops 22 to 26 inclusive which are formed by bending the ends of the longitudinal bars 15 of the reel outwardly and causing them to pass through the rims of the circular end 13, and then bending said projecting end portions onto themselves, as clearly shown in Fig. 7. These confining and supporting loops at the rear or lower end of the reel are made to gradually increase in width so that each succeeding loop will stand above the plane of the preceding one when the reel is in a vertical position, as shown in Fig. 1, the purpose of which is to cause the hose to wind spirally upon the reel, whereby it is given proper drainage so that when the reel is filled and is placed in a vertical position, all of the water will drain from the hose, preventing the deterioration thereof. The upper end of the reel is provided with the radially extending guides or fingers 27 formed by bending the ends of the horizontal rods 15 at right angles, as shown. In addition to the fingers 27, the upper end of the reel is provided with radially extending hose supporting brackets 28 having the open vertical loops 29, as shown in Fig. 5, for the reception of the end of the hose, said brackets being variously disposed about the reel so as to enable the end of the hose to be supported at any desired point, according to the length thereof which may be projecting from the reel.

It is designed to support the reel in a horizontal or inclined position when winding the hose thereon. To enable the reel to be so supported, the diverging legs 30 are employed joined at their upper ends and pivoted at 31 to a bracket 32 projecting from the coupling 2. Near the juncture of said diverging legs they are connected by a cross bar 33 (see Fig. 3). Secured at 34 to the tube 1 is an upwardly curved spring 35 having a loop 36 therein adapted to engage the cross bar 33 of the legs when said legs are swung outwardly, as shown in Fig. 4, and brace said legs so as to enable them to support the frame and reel in an inclined position while the hose is being reeled thereon. When rotating the reel to reel up the hose, it is turned through the medium of the crank 12.

Connected with the coupling 2 is a transverse handle 37 to enable the reel to be conveniently wheeled from place to place.

For the purpose of locking the reel against rotation, a hook 38 is employed which is secured by an eye bolt to the tube 1, and which is adapted to engage the reel as shown in Fig. 1.

When it is desired to employ the rotary sprinkling arms for sprinkling the lawn, the nozzle may be detached from the hose 39 and the end thereof connected by the coupling 18 to the head 19. The opposite end of the hose 39 may be connected to a penstock, not shown, and a portion of the hose left on the reel through which water may pass to said sprinkling arms as shown in Fig. 1. If desired, when so employed, the cord 40 may be attached to the arm projecting from the coupling 9 to enable the reel to be drawn about over the lawn. Instead of connecting the end of the hose with the rotary sprinkling arms 21, the nozzle may be left thereon and said nozzle supported in one of the brackets 28 at the upper end of the reel, in which position the nozzle may be made to serve as a sprinkler.

Having thus fully set forth my invention, what I claim as new and desire to secure by Letters Patent, is:—

1. In a transportable hose reel, the combination of a frame consisting of a single longitudinal member and right angle end members extending from the terminals thereof, transporting wheels connected with the main longitudinal member, and an auxiliary wheel connected with the outer end of one of the end members, a reel journaled between the right angle end members, means for rotating the reel, and means for supporting the reel in a substantially horizontal position.

2. In a transportable hose reel, the combination of a frame consisting of a single longitudinal member and right angle end members extending from the terminals thereof, transportable wheels connected to one end of the main longitudinal member, an auxiliary wheel connected with the outer end of one of the end members and coöperating with the transportable wheels to support the frame in a vertical position, a hose reel journaled between the right angle end members of the frame, means for rotating said reel, means for directing a line of hose spirally onto the reel, and means for supporting the frame and reel in a substantially horizontal position.

In testimony whereof, I sign this specification in the presence of two witnesses.

JOHN MARTYN.

Witnesses:
  I. G. HOWLETT,
  E. S. WHEELER.